United States Patent
Cao et al.

(10) Patent No.: US 10,155,686 B2
(45) Date of Patent: Dec. 18, 2018

(54) GLASS FIBER COMPOSITION, GLASS FIBER AND COMPOSITE MATERIAL THEREFROM

(71) Applicant: JUSHI GROUP CO., LTD., Tongxiang (CN)

(72) Inventors: Guorong Cao, Tongxiang (CN); Lin Zhang, Tongxiang (CN); Wenzhong Xing, Tongxiang (CN); Guijiang Gu, Tongxiang (CN)

(73) Assignee: JUSHI GROUP CO., LTD., Tongxiang, Zhejiang (CN)

( * ) Notice: Subject to any disclaimer, the term of this patent is extended or adjusted under 35 U.S.C. 154(b) by 0 days.

(21) Appl. No.: 15/511,582

(22) PCT Filed: Dec. 29, 2014

(86) PCT No.: PCT/CN2014/095401
§ 371 (c)(1),
(2) Date: Mar. 15, 2017

(87) PCT Pub. No.: WO2016/045222
PCT Pub. Date: Mar. 31, 2016

(65) Prior Publication Data
US 2017/0283309 A1    Oct. 5, 2017

(30) Foreign Application Priority Data
Sep. 22, 2014 (CN) .......................... 2014 1 0487975

(51) Int. Cl.
*C03C 13/00* (2006.01)
*C03C 3/087* (2006.01)
*C03C 3/095* (2006.01)
*C03B 37/075* (2006.01)

(52) U.S. Cl.
CPC .............. *C03C 13/00* (2013.01); *C03C 3/087* (2013.01); *C03C 3/095* (2013.01); *C03B 37/075* (2013.01)

(58) Field of Classification Search
CPC ......... C03C 13/00; C03C 13/06; C03C 3/087; C03C 3/095
See application file for complete search history.

(56) References Cited

U.S. PATENT DOCUMENTS

| | | | |
|---|---|---|---|
| 3,892,581 A | 7/1975 | Burgman et al. | |
| 4,199,364 A | 4/1980 | Neely | |
| 2010/0160528 A1 | 6/2010 | Fujiwara et al. | |
| 2011/0039681 A1* | 2/2011 | Lecomte | C03C 3/087 501/38 |
| 2012/0135849 A1* | 5/2012 | Hoffman | C03C 3/087 501/38 |
| 2013/0203583 A1* | 8/2013 | Zhang | C03C 13/00 501/38 |
| 2015/0291767 A1* | 10/2015 | Owada | C08K 3/40 524/611 |

FOREIGN PATENT DOCUMENTS

| | | |
|---|---|---|
| CN | 1802327 | 7/2006 |
| CN | 101119939 | 2/2008 |
| CN | 101687692 | 3/2010 |
| CN | 101691278 | 4/2010 |
| CN | 101838110 | 9/2010 |
| CN | 102482142 | 5/2012 |
| JP | 2006-22236 | 1/2006 |
| JP | 2011-162415 | 8/2011 |

OTHER PUBLICATIONS

From Chinese Patent Application No. 201410486801.3, Search Report dated Nov. 16, 2015.
From Chinese Patent Application No. 201410486801.3, Office Action dated Nov. 24, 2015 with English translation.
From Chinese Patent Application No. 201410487975.1, Search Report dated Nov. 16, 2015.
From Chinese Patent Application No. 201410487975.1, Office Action dated Nov. 24, 2015 with English translation.
From Chinese Patent Application No. 201010176217.x, Reexamination Decision dated Aug. 30, 2013 with English translation.
From Chinese Patent Application No. 201010176217.x, Rejected Decision dated Oct. 26, 2011 with English translation.
From Chinese Patent Application No. 201010176217.x, Office Action dated Apr. 28, 2011 with English translation.
U.S. Appl. No. 15/511,585, filed Mar. 15, 2017, Jushi Group Co., Ltd.
From PCT/CN2014/095400, International Search Report dated Jun. 16, 2015 with English translation.
From PCT/CN2014/095400, Written Opinion dated Jun. 16, 2015 with English translation.
From PCT/CN2014/095400, International Preliminary Report on Patentability (IPRP; Ch. I) dated Mar. 28, 2017 with English translation.
From PCT/CN2014/095401, International Search Report dated Jun. 12, 2015 with English translation.
From PCT/CN2014/095401, Written Opinion dated Jun. 12, 2015 with English translation.

(Continued)

*Primary Examiner* — Elizabeth A. Bolden
(74) *Attorney, Agent, or Firm* — Ladas & Parry, LLP

(57) ABSTRACT

The present invention provides a glass fiber composition, glass fiber and composite material therefrom. The glass fiber composition comprises the following components expressed as percentage by weight: 56-64% $SiO_2$, 12-18% $Al_2O_3$, 0.1-1% $Na_2O$, 0.1-1% $K_2O$, 0.1-1% $Fe_2O_3$, 0.05-1% $Li_2O+Bi_2O_3$, 19-25% CaO+MgO+SrO, 0.1-1.5% $TiO_2$ and 0-1% $CeO_2$, wherein a weight percentage ratio C1=$Li_2O/Bi_2O_3$ is greater than 1, and a weight percentage ratio C2=(MgO+SrO)/CaO is 0.4-1, and a weight percentage ratio C3=MgO/(MgO+SrO) is greater than 0.7. Said composition reduces the amount of bubbles, viscosity and crystallization risk of the glass, thereby making it more suitable for large-scale production with refractory-lined furnaces.

19 Claims, No Drawings

(56) References Cited

OTHER PUBLICATIONS

From PCT/CN2014/095401, International Preliminary Report on Patentability (IPRP; Ch. I) dated Mar. 28, 2017 with English translation.
From PCT/CN2011/074283, International Search Report dated Aug. 25, 20111 with English translation.
From PCT/CN2011/074283, Written Opinion dated Aug. 25, 2011 with English translation.
From PCT/CN2011/074283, International Preliminary Report on Patentability (IPRP; Ch. II) dated Aug. 17, 2012 with English translation.
From U.S. Appl. No. 15/511,585 (unpublished), Application and Office Actions.

\* cited by examiner

GLASS FIBER COMPOSITION, GLASS FIBER AND COMPOSITE MATERIAL THEREFROM

CROSS REFERENCE TO RELATED APPLICATIONS

This application is the U.S. national phase of PCT Application No. PCT/CN2014/095401 filed on Dec. 29, 2014, which claims the priority of Chinese Patent Application 201410487975.1, filed Sep. 22, 2014 and titled "A Glass Fiber Composition, Glass Fiber and Composite Material Therefrom", the disclosures of which are incorporated in their entireties by reference herein.

FIELD OF THE INVENTION

The present invention relates to a glass fiber composition, specifically to a high-performance glass fiber composition that can be used as a reinforcing base material for composites, and to a glass fiber and composite material therefrom.

BACKGROUND OF THE INVENTION

Glass fiber is an inorganic fiber material and can be used to reinforce resins to produce composite materials with good performance. As a reinforcing base material for advanced composite materials, high-performance glass fibers were originally used mainly in the national defense industry, such as aeronautic, aerospace and military industry. With the progress of science and technology and the development of economy, high-performance glass fibers have been widely used in civil and industrial fields such as motors, wind blades, pressure vessels, offshore oil pipes, sports apparatus and auto industry.

Since the US developed S-2 glass fiber, different countries have competed in developing high-performance glass fibers with various compositions, e.g. R glass fiber developed by France, HiPer-tex glass fiber developed by the US and high-strength glass fiber 2# developed by China. The original high-performance glass compositions were based on an MgO—$Al_2O_3$—$SiO_2$ system and a typical solution was S-2 glass of the US. However, the production of S-2 glass is excessively difficult, as its forming temperature is up to about 1571° C. and its liquidus temperature up to 1470° C. and therefore it is difficult to realize large-scale industrial production.

Thereafter, in order to decrease the melting temperature and forming temperature of glass to better satisfy the needs of large-scale production with refractory-lined furnaces, large foreign companies successively developed high-performance glasses based on an MgO—CaO—$Al_2O_3$—$SiO_2$ system. Typical solutions were R glass of France and HiPer-tex glass of the US, which were a trade-off for production scale by sacrificing some of the glass properties. However, as these designed solutions were too conservative, especially the content of $Al_2O_3$ was kept more than 20%, preferably 25%, the production of glass remained highly difficult. Although small-scale production with refractory-lined furnaces was achieved, the production efficiency was low and the cost performance ratio of the products was not high. The traditional R glass is difficult to fiberized as its forming temperature is up to about 1410° C. and its liquidus temperature up to 1330° C., which causes difficulty in attenuating glass fiber and consequently in realizing large-scale industrial production.

In addition, there is an improved type of R glass fiber, and its strength and modulus are much higher than those of the traditional E glass fiber and its melting and forming conditions are better than those of the traditional R glass fiber. However, this type of R glass has a high risk of devitrification. Meanwhile, since too much $Li_2O$ is introduced, not only the chemical stability of the glass is decreased, but also its raw material cost gets significantly higher. Therefore it is also not suitable for large-scale industrial production.

The High-strength 2# glass fiber mainly comprises $SiO_2$, $Al_2O_3$ and MgO, and certain amounts of $Li_2O$, $B_2O_3$, $CeO_2$ and $Fe_2O_3$ are also introduced. It also has high strength and high modulus and its forming temperature is only about 1245° C. and its liquidus temperature is 1320° C. Both temperatures are much lower than those of S glass fiber. However, since its forming temperature is lower than its liquidus temperature, which is unfavorable for the control of glass fiber attenuation, the forming temperature has to be increased and specially-shaped tips have to be used to prevent a glass crystallization phenomenon from occurring in the fiber attenuation process. This causes difficulty in temperature control and also makes it difficult to realize large-scale industrial production.

Owing to the restriction in production conditions, i.e., the unsuitability for large-scale industrial production, the high-performance glass fibers available at present is very expensive both for their high production costs and selling prices, which lead to a very small output of these fibers. They are utilized only in a limited application fields such as aeronautic, aerospace and military, and cannot satisfy the large demands from the new fields such as high-power wind blades, high-pressure pipelines and pressure vessels.

SUMMARY OF THE INVENTION

The purpose of the present invention is to provide a high-performance glass fiber composition which not only ensures that the glass fiber has high mechanical properties, but also overcomes the issue of too high forming and liquidus temperatures in the traditional high-performance glasses which lead to difficulties in clarifying and homogenizing glass melt and achieving large-scale production, greatly improves the quality of glass melt, significantly decreases the amount of bubbles in glass melt under the same conditions and, meanwhile, has a particularly outstanding glass refractive index which greatly improves transparency of glass fiber-reinforced articles.

According to one aspect of the present invention, a glass fiber composition is provided comprising the following components expressed as percentage by weight:

| | |
|---|---|
| $SiO_2$ | 56-64% |
| $Al_2O_3$ | 12-18% |
| $Na_2O$ | 0.1-1% |
| $K_2O$ | 0.1-1% |
| $Fe_2O_3$ | 0.1-1% |
| $Li_2O + Bi_2O_3$ | 0.05-1% |
| CaO + MgO + SrO | 19-25% |
| $TiO_2$ | 0.1-1.5% |
| $CeO_2$ | 0-1% | wherein, a weight percentage ratio $C1=Li_2O/Bi_2O_3$ is greater than 1; a weight percentage ratio $C2=(MgO+SrO)/CaO$ is 0.4-1; a weight percentage ratio $C3=MgO/(MgO+SrO)$ is greater than 0.7.

Wherein, a weight percentage ratio C1=$Li_2O/Bi_2O_3$ is 2-12.

Wherein, a weight percentage ratio C2=(MgO+SrO)/CaO is 0.45-0.9, and a weight percentage ratio C3=MgO/(MgO+SrO) is greater than 0.85.

Wherein, the content range of CaO by weight percentage is greater than 9.5% and less than 12%.

Wherein, the content range of $Bi_2O_3$ by weight percentage is 0.02-0.35%.

Wherein, the composition comprises the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.1-0.9% |
| CaO + MgO + SrO | 20-24% |
| $TiO_2$ | 0.1-1.5% |
| SrO | 0-2% |
| $CeO_2$ | 0-1% | wherein, a weight percentage ratio C1=$Li_2O/Bi_2O_3$ is greater than 1; a weight percentage ratio C2=(MgO+SrO)/CaO is 0.45-0.9; a weight percentage ratio C3=MgO/(MgO+SrO) is greater than 0.85.

Wherein, the content range of SrO by weight percentage is 0.02-1.5%.

Wherein, the composition comprises the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.2-0.8% |
| CaO + MgO + SrO | 21-23.5% |
| $TiO_2$ | 0.1-1.5% |
| SrO | 0.02-1.5% |
| $CeO_2$ | 0-1% | wherein, a weight percentage ratio C1=$Li_2O/Bi_2O_3$ is 2-12; a weight percentage ratio C2=(MgO+SrO)/CaO is 0.45-0.9; a weight percentage ratio C3=MgO/(MgO+SrO) is greater than 0.85.

According to another aspect of this invention, a glass fiber produced with said glass fiber composition is provided.

According to yet another aspect of this invention, a composite material incorporating said glass fiber is provided.

By reasonably configuring the content range of $Li_2O+Bi_2O_3$, the ratio range of $Li_2O/Bi_2O_3$ and the content ratio among CaO, MgO and SrO, and utilizing the synergistic effect of $Li_2O$ and $Bi_2O_3$ and the CaO, MgO and SrO ternary mixed alkali earth effect, the glass fiber composition of the present invention ensures that the resulting glass fiber not only has high mechanical properties, but also has the melting, clarifying and fiber forming performances that are close to those of E glass while having the melting and forming temperatures significantly lower than those of the traditional R glass, and meanwhile, further reduces the amount of bubbles, viscosity and crystallization risk of glass, thereby making it more suitable for large-scale production with refractory-lined furnaces.

Specifically, the glass fiber composition according to the present invention comprises the following components expressed as percentage by weight:

| | |
|---|---|
| $SiO_2$ | 56-64% |
| $Al_2O_3$ | 12-18% |
| $Na_2O$ | 0.1-1% |
| $K_2O$ | 0.1-1% |
| $Fe_2O_3$ | 0.1-1% |
| $Li_2O + Bi_2O_3$ | 0.05-1% |
| CaO + MgO + SrO | 19-25% |
| $TiO_2$ | 0.1-1.5% |
| SrO | 0-2% |
| $CeO_2$ | 0-1% | wherein, a weight percentage ratio C1=$Li_2O/Bi_2O_3$ is greater than 1, and a weight percentage ratio C2=(MgO+SrO)/CaO is 0.4-1, and a weight percentage ratio C3=MgO/(MgO+SrO) is greater than 0.7.

The effect and content of each component in said glass fiber composition is described as follows:

$SiO_2$ is a main oxide forming the glass network and has the effect of stabilizing all the components. In the glass fiber composition of the present invention, the restricted content range of $SiO_2$ is 56-64%. $SiO_2$ content being too low will affect the mechanical properties of the glass; $SiO_2$ content being too high will cause the glass viscosity to be excessively high thereby resulting in melting and clarifying issues. Preferably, the $SiO_2$ content range can be 58-62%.

$Al_2O_3$ is another oxide forming the glass network. When combined with $SiO_2$, it can have a substantive effect on the mechanical properties of the glass and a significant effect on preventing glass phase separation and on water resistance. The restricted content range of $Al_2O_3$ in the glass fiber composition of this invention is 12-18%. $Al_2O_3$ content being too low will increase the liquidus temperature and meanwhile decrease the mechanical properties and water resistance of glass; $Al_2O_3$ content being too high will cause the glass viscosity to be excessively high thereby resulting in melting and clarifying issues, and increase the devitrification risk of glass. Preferably, the $Al_2O_3$ content can be 14-16.5%.

Both $K_2O$ and $Na_2O$ can reduce glass viscosity and are good fluxing agents. Replacing $Na_2O$ with $K_2O$ while keeping the total amount of alkali metal oxides unchanged can reduce the crystallization tendency of glass, improve the fiberizing performance, and also reduce the surface tension of molten glass and improve the glass melting performance. Therefore, in the glass fiber composition of the present invention, a favorable effect can be achieved by restricting the content range of $Na_2O$ between 0.1-1% and the content range of $K_2O$ between 0.1-1%.

$Fe_2O_3$ facilitates the melting of glass and can also improve the crystallization performance of glass. However, since ferric ions and ferrous ions have a coloring effect, the introduced amount should be limited. Therefore, in the glass fiber composition of the present invention, the restricted content range of $Fe_2O_3$ is 0.1-1%.

$CeO_2$ can not only produce an excellent nontoxic clarifying effect, but also oxidize a portion of the ferrous ions into ferric ions, and lighten the green color of the glass fiber. As high-strength glasses in the prior art are difficult to clarify and homogenize, in order to ensure the clarifying and homogenizing quality of the glass melt, a proper amount of $CeO_2$ is introduced in the glass fiber composition of this invention. The restricted content range of $CeO_2$ in this invention is 0-1%. Preferably, the $CeO_2$ content can be 0.02-0.4%.

$TiO_2$ can not only reduce the glass viscosity at high temperature, but also has a certain fluxing effect. Therefore, a certain amount of $TiO_2$ is introduced in the glass fiber composition of the present invention, and the restricted content range of $TiO_2$ is 0.1-1.5%.

$Li_2O$ and $Bi_2O_3$ can also be included in the glass fiber composition of the present invention. Introduction of these two components alone can produce beneficial effects respectively. Compared with $Na_2O$ and $K_2O$, $Li_2O$ can not only significantly reduce glass viscosity thereby improving the glass melting performance, but also help greatly improve the mechanical properties of glass. $Bi_2O_3$ is a highly effective fluxing agent and, when introduced at an appropriate amount, can effectively improve the melting performance of glass by facilitating the removal of bubbles in the glass melt and improving the homogeneity of glass, and in the meantime play a positive role on the viscosity and crystallization temperature of glass, thereby ensuring the stability of fiber forming process. In addition, $Bi_2O_3$ can also help to increase the softening point and refractive index of glass. However, an excessive amount of $Bi_2O_3$ can easily reduce the flexural and compressive strength of glass. Therefore, $Bi_2O_3$ needs to be introduced at an appropriate amount.

The inventors find from a great amount of experiments and researches that $Bi_2O_3$ is a conditional glass former. Specifically, in an appropriate glass system, when there are sufficient free oxygen and many metal ions with high ionic field strength, $Bi_2O_3$ can have a better fluxing effect at high temperature melting stage and, at lower temperature fiber forming stage, $Bi_2O_3$ can enter the glass network more easily in the form of $BiO_6$ and, at the same time it reinforces more effectively the network structure due to the buildup effect of high field strength metal ions. However, all the above conditions can exactly be satisfied by $Li_2O$. Therefore, $Bi_2O_3$ and $Li_2O$ are used simultaneously in the invention. The inventors find from the researches that, when $Bi_2O_3$ and $Li_2O$ are used simultaneously with a relatively low total amount of them and at an appropriate ratio therebetween, the overall effect is much better than the accumulative effect produced when $Bi_2O_3$ and $Li_2O$ are used separately. Therefore, it is highly important to determine the appropriate amounts and ratio for $Bi_2O_3$ and $Li_2O$.

The glass fiber composition of the present invention including both $Li_2O$ and $Bi_2O_3$ can significantly enhance the beneficial effects of $Bi_2O_3$, e.g., improvement of glass melting effect, effective removal of bubbles from glass melt, improvement of glass homogeneity and increase of softening point and refractive index. On the other hand, with the introduction of $Li_2O$, the glass including $Bi_2O_3$ will not reduce the flexural and compressive strength. The inventors find from experiments and researches that, in the glass fiber composition of the present invention, the beneficial effect of $Li_2O$ and $Bi_2O_3$ can be well achieved when the restricted content range of $Li_2O+Bi_2O_3$ is 0.05-1% and the weight percentage ratio $C1=Li_2O/Bi_2O_3$ is greater than 1. However, due to the high cost of $Bi_2O_3$ and $Li_2O$ as well as the potential negative effect of high content of $Bi_2O_3$ on the flexural and compressive strength of glass, the restricted content of $Li_2O+Bi_2O_3$ is relatively low in the present application. Preferably, the restricted content of $Li_2O+Bi_2O_3$ can be 0.1-0.9%, and more preferably 0.2-0.8%. In order to ensure that a small amount of $Bi_2O_3$ can enter the glass network as much as possible in the form of $BiO_6$, it is necessary to keep the ratio $C1=Li_2O/Bi_2O_3$ greater than 1, where a relatively large amount of lithium ions and free oxygen will significantly strengthen the beneficial effects produced by $Bi_2O_3$. Therefore, such effects will be increasingly enhanced as the ratio C1 increases while the content of $Bi_2O_3$ remains unchanged. However, such change will tend to flatten out when C1 exceeds 7.5.

The beneficial effects achieved by employing a combination of $Li_2O$ and $Bi_2O_3$ will be explained through the specific parameters given in the tables hereafter.

The glass fiber composition of this invention uses the CaO, MgO and SrO ternary mixed alkali earth effect. Generally, the CaO and MgO binary mixed alkali earth effect is well known to the person skilled in the art, while the CaO, MgO and SrO ternary mixed alkali earth effect, especially the special one in which the content of CaO+MgO+SrO is up to 19% or beyond and the content of SrO not more than 2%, has scarcely been reported. The following is a detailed description of the CaO, MgO and SrO ternary mixed alkali earth effect in this invention and how the contents of these three components are determined respectively.

Firstly, for comparison, the CaO and MgO binary mixed alkali earth effect is briefly described. CaO primarily has the effect of regulating the glass viscosity and controlling the glass crystallization. MgO has the similar effect and, due to the higher field strength of $Mg^{2+}$, plays a significant role in increasing the strength and modulus of glass. On the other hand, the disadvantage of MgO lies in that an excessive amount of it will increase the crystallization tendency and rate of glass, thereby resulting in a risk of crystals (e.g., diopside) precipitation in the glass melt. By rationally determining the content ratio of CaO to MgO and taking advantage of competitive growth between the two crystals, i.e. anorthite ($CaAl_2Si_2O_8$) and diopside ($CaMgSi_2O_6$), the growth of the two crystals is delayed, thereby achieving the objective of reducing the risk of devitrification.

We find from a great amount of experiments and researches that, when their ratios are rational, the technical effect of the CaO, MgO and SrO ternary mixed alkali earth effect is better than that of the CaO and MgO binary mixed alkali earth effect. This is because, as more alkali earth metal ions with different radius participate in the replacement process, a compact stacking structure forms more easily and thereby the glass has better mechanical, optical and corrosion resistance properties. As for CaO, MgO and SrO introduced into the glass fiber composition of the invention, in order to achieve a compact stacking structure, the matching between the numbers of three types of ions, i.e. $Ca^{2+}$, $Mg^{2+}$ and $Sr^{2+}$, in this invention becomes very important. Since the ionic radiuses of $Mg^{2+}$, $Ca^{2+}$ and $Sr^{2+}$ sequentially become bigger, the ions with the smallest radius and those with the biggest radius need to be matched well. The research shows that, when a small amount of SrO is introduced in the glass fiber composition and the ratio of (MgO+SrO)/CaO is rationally adjusted, the tendency and rate of the glass crystallization can be effectively controlled, and a certain amount of SrO is introduced only when the content of MgO is relatively high. A ratio of MgO/SrO within a reasonable range greatly enchances the mixed alkali earth effect. Therefore, by taking CaO, MgO and SrO as the parameters for controlling the mechanical, optical and crystallization properties of glass fiber, this application determines the contents of these three components in the corresponding glass systems so as to achieve better mechanical and optical properties and a lower crystallization temperature and risk.

Therefore, the present invention comprehensively considers the CaO, MgO and SrO ternary mixed alkali earth effect and selects an appropriate SrO content to be able to achieve higher mechanical properties, a lower crystallization temperature and risk and an improved glass refractive index. Furthermore, the inventors find from researches on SrO that SrO in a glass system with high contents of alkali earth metal oxides can not only increase the refractive index of glass, but also effectively improve its compressive strength. However, as the molecular weights of both strontium oxide and bismuth oxide are relatively high, an excessive addition of either of them will lead to an increase of the glass density, which will have a negative impact on the specific strength and specific modulus of glass fiber. Therefore, a relatively small amount of SrO is introduced in the glass fiber composition of the present invention. The restricted content range of CaO+MgO+SrO in the present invention is 19-25%, wherein the content range of SrO is 0-2%, and a weight percentage ratio C2=(MgO+SrO)/CaO is 0.4-1, and a weight percentage ratio C3=MgO/(MgO+SrO) is greater than 0.7. Preferably, the restricted content range of CaO+MgO+SrO in the present invention is 20-24%, and more preferably 21-23.5%. Preferably, the content range of SrO can be 0.02-1.5%.

In addition, our research shows, from the perspective of simple replacement, compared with CaO, SrO can better improve the compressive strength and refractive index of the glass and the difference in their effect on the rate of hardening of molten glass (workability) is big; compared with MgO, SrO can better improve the tensile strength, elastic modulus and refractive index of the glass and the difference in their effect on the rate of hardening of molten glass is small. Besides, compared with CaO, MgO can better improve the elastic modulus and reduce the crystallization temperature of glass, and the difference in their effect on the rate of hardening of molten glass is big. At the same time, considering the matching between the sizes of ions, it is appropriate to control the ratio of the sum of SrO and MgO to CaO. The inventors have found that, when the range of C2 is kept to be 0.4-1 and C3 greater than 0.7 with a content of strontium oxide not more than 2%, the mechanical properties and refractive index of the glass have improved especially significantly on one hand and, on the other hand, the crystallization temperature and degree of the glass have decreased especially noticeably, and what's more, the density of glass increases very slightly. The inventors believe that this is perhaps because the stacking of the ternary alkali earth oxides is so compact on the premise of the above ranges that the glass structure becomes especially stable, thereby resulting in an unexpected improvement of the glass properties. In addition, it is noteworthy that on the premise of the above ranges, when the content of CaO is over 9.5% and less than 12%, the modulus of the glass will be particularly outstanding. By contrast, when the ratio C2=(MgO+SrO)/CaO is less than 0.4, such drawbacks as dramatically decreased elastic modulus, too low a compressive strength and too low a rate of hardening of molten glass would happen, which causes not only that the glass properties will be deteriorated, but also that the fiberizing efficiency of glass will be impaired.

In addition, the glass fiber composition of the present invention allows the existence of a small amount of fluorine. However, considering the great negative impact of fluorine on environment, normally it is not intentionally added.

In the embodiments according to the present invention, preferably the weight percentage ratio $C1=Li_2O/Bi_2O_3$ can be 2-12, and the weight percentage ratio $C2=(MgO+SrO)/CaO$ can be 0.45-0.9, and the weight percentage ratio $C3=MgO/(MgO+SrO)$ can be greater than 0.85.

More preferably, the weight percentage ratio $C1=Li_2O/Bi_2O_3$ can be 7.5, and the weight percentage ratio $C2=(MgO+SrO)/CaO$ can be 0.85, and the weight percentage ratio $C3=MgO/(MgO+SrO)$ can be 0.85.

It is found through further experiments and researches that, more advantageous results can be achieved by rationally determining the content ranges for $Li_2O$, $Bi_2O_3$ and SrO respectively, wherein the content range of $Li_2O$ in percentage by weight can be 0.1-0.7%, and the content range of $Bi_2O_3$ 0.02-0.35%, and the content range of SrO 0.02-1.5%.

In the glass fiber composition of the present invention, the beneficial effects produced by the aforementioned selected ranges of the components will be explained through the specific experimental data provided below.

The following are examples of preferred content ranges of the components contained in the glass fiber composition according to the present invention.

PREFERRED EXAMPLE 1

The glass fiber composition according to the present invention comprises the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.1-0.9% |
| CaO + MgO + SrO | 20-24% |
| $TiO_2$ | 0.1-1.5% |
| SrO | 0-2% |
| $CeO_2$ | 0-1% | wherein, a weight percentage ratio $C1=Li_2O/Bi_2O_3$ is greater than 1, and a the weight percentage ratio $C2=(MgO+SrO)/CaO$ is 0.45-0.9, and a weight percentage ratio $C3=MgO/(MgO+SrO)$ is greater than 0.85.

PREFERRED EXAMPLE 2

The glass fiber composition according to the present invention comprises the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.2-0.8% |
| CaO + MgO + SrO | 21-23.5% |
| $TiO_2$ | 0.1-1.5% |
| SrO | 0.02-1.5% |
| $CeO_2$ | 0-1% | wherein, a weight percentage ratio $C1=Li_2O/Bi_2O_3$ is 2-12, and a weight percentage ratio $C2=(MgO+SrO)/CaO$ is 0.45-0.9, and a weight percentage ratio $C3=MgO/(MgO+SrO)$ is greater than 0.85.

PREFERRED EXAMPLE 3

The glass fiber composition according to the present invention comprises the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.2-0.8% |
| $CaO + MgO + SrO$ | 21-23.5% |
| $TiO_2$ | 0.1-1.5% |
| $Bi_2O_3$ | 0.02-0.35% |
| $SrO$ | 0.02-1.5% |
| $CeO_2$ | 0.02-0.4% | wherein, a weight percentage ratio $C1=Li_2O/Bi_2O_3$ is 2-12, and a weight percentage ratio $C2=(MgO+SrO)/CaO$ is 0.45-0.9, and a weight percentage ratio $C3=MgO/(MgO+SrO)$ is greater than 0.85.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall fall into the scope of protection of the present invention. What needs to be made clear is that, as long as there is no conflict, the examples and the features of examples in the present application can be arbitrarily combined with each other. The basic concept of the present invention is that the components of the glass fiber composition expressed as percentage by weight are: 58-64% $SiO_2$, 12-18% $Al_2O_3$, 0.1-1% $Na_2O$, 0.1-1% $K_2O$, 0.1-1% $Fe_2O_3$, 0.05-1% $Li_2O+Bi_2O_3$, 19-25% $CaO+MgO+SrO$, 0.1-1.5% $TiO_2$, 0-2% SrO and 0-1% $CeO_2$; wherein, a weight percentage ratio $C1=Li_2O/Bi_2O_3$ is greater than 1, and a weight percentage ratio $C2=(MgO+SrO)/CaO$ is 0.4-1, and a weight percentage ratio $C3=MgO/(MgO+SrO)$ is greater than 0.7. Each component with content above in the glass fiber composition according to the invention can reduce the forming temperature and liquidus temperature of the glass fiber, provide the melting, clarifying and fiberizing performances of the glass close to those of E-glass and the melting and reduce fiberizing temperatures significantly with respect to those of R-glass, and in the meantime, further reduce the amount of bubbles, viscosity and crystallization risk of the glass, thereby making it more suitable for large-scale production with refractory-lined furnaces.

The specific content values of $SiO_2$, $Al_2O_3$, $Na_2O$, $K_2O$, $Fe_2O_3$, $Li_2O$, $Bi_2O_3$, CaO, MgO, SrO, $CeO_2$ and $TiO_2$ in the glass fiber composition of the present invention are selected to be used in the examples and comparisons with traditional E glass and traditional R glass that are made in terms of the following six property parameters, (1) Forming temperature, the temperature at which the glass melt has a viscosity of $10^3$ poise.

(2) Liquidus temperature, the temperature at which the crystal nucleuses begin to form when the glass melt cools off—i.e., the upper limit temperature for glass crystallization.

(3) ΔT value, which is the difference between the forming temperature and the liquidus temperature and indicates the temperature range at which fiber drawing can be performed.

(4) Filament strength, the tensile strength that a filament of glass fiber strand can withstand.

(5) Refractive index, the ratio of the speed of light in air to the speed of light in glass.

(6) Amount of bubbles, to be determined approximately in a procedure set out as follows: Use specific moulds to compress the batch materials in each example into samples of same dimension, which will then be placed on the sample platform of a high temperature microscope. Heat the glass samples according to standard procedures up to the pre-set spatial temperature 1500° C. and then the glass sample is cooled to the ambient temperature without heat preservation. Finally, each of the glass samples is examined under a polarizing microscope to determine the amount of bubbles in the samples. A bubble is identified according to a specific amplification of the microscope.

The aforementioned six parameters and the methods of measuring them are well known to those skilled in the art. Therefore, the aforementioned parameters can be effectively used to explain the properties of the glass fiber composition of the present invention.

The specific procedures for the experiments are as follows: Each component can be acquired from the appropriate raw materials; the raw materials is mixed in the appropriate proportions so that each component reaches the final expected weight percentage; the mixed batch is melted and clarified; then the molten glass is drawn out through the tips of the bushings, thereby forming the glass fiber; the glass fiber is attenuated onto the rotary collet of a winder to form cakes or packages. Of course, conventional methods can be used to deeply process these glass fibers to meet the expected requirements.

The exemplary embodiments of the glass fiber composition according to the present invention are given below.

EXAMPLE 1

| | |
|---|---|
| $SiO_2$ | 59.5% |
| $Al_2O_3$ | 15.5% |
| $Na_2O$ | 0.2% |
| $K_2O$ | 0.6% |
| $Fe_2O_3$ | 0.35% |
| $Li_2O$ | 0.64% |
| $Bi_2O_3$ | 0.32% |
| CaO | 11.9% |
| MgO | 8.9 |
| SrO | 2.0 |
| $TiO_2$ | 0.4% |
| $CeO_2$ | 0% | wherein, the weight percentage ratio $C1=Li_2O/Bi_2O_3$ is 2.0, and the weight percentage ratio $C2=(MgO+SrO)/CaO$ is 0.91, and the weight percentage ratio $C3=MgO/(MgO+SrO)$ is 0.82.

In Example 1, the measured values of the six parameters are respectively:

| | |
|---|---|
| Forming temperature | 1274° C. |
| Liquidus temperature | 1196° C. |
| ΔT | 78° C |
| Filament strength | 4175 MPa |
| Refractive index | 1.570 |
| Amount of bubbles | 4 |

EXAMPLE 2

| | |
|---|---|
| $SiO_2$ | 60.0% |
| $Al_2O_3$ | 15.5% |
| $Na_2O$ | 0.2% |
| $K_2O$ | 0.5% |
| $Fe_2O_3$ | 0.42% |
| $Li_2O$ | 0.06% |
| $Bi_2O_3$ | 0.02% |
| CaO | 11.9% |
| MgO | 8.9% |
| SrO | 1.0% |
| $TiO_2$ | 1.0% |
| $CeO_2$ | 0% | wherein, the weight percentage ratio $C1=Li_2O/Bi_2O_3$ is 3.0, and the weight percentage ratio $C2=(MgO+SrO)/CaO$ is 0.83, and the weight percentage ratio $C3=MgO/(MgO+SrO)$ is 0.90.

In Example 2, the measured values of the six parameters are respectively:

| | |
|---|---|
| Forming temperature | 1282° C. |
| Liquidus temperature | 1197° C. |
| ΔT | 85° C. |
| Filament strength | 4120 MPa |
| Refractive index | 1.568 |
| Amount of bubbles | 9 |

EXAMPLE 3

| | |
|---|---|
| $SiO_2$ | 59.6% |
| $Al_2O_3$ | 15.4% |
| $Na_2O$ | 0.2% |
| $K_2O$ | 0.2% |
| $Fe_2O_3$ | 0.42% |
| $Li_2O$ | 0.72% |
| $Bi_2O_3$ | 0.06% |
| CaO | 15.5% |
| MgO | 7.6% |
| SrO | 0% |
| $TiO_2$ | 0.3% |
| $CeO_2$ | 0% | wherein, the weight percentage ratio $C1=Li_2O/Bi_2O_3$ is 12.0, and the weight percentage ratio $C2=(MgO+SrO)/CaO$ is 0.49, and the weight percentage ratio $C3=MgO/(MgO+SrO)$ is 1.0.

In Example 3, the measured values of the six parameters are respectively:

| | |
|---|---|
| Forming temperature | 1272° C. |
| Liquidus temperature | 1196° C. |
| ΔT | 76° C. |
| Filament strength | 4170 MPa |
| Refractive index | 1.569 |
| Amount of bubbles | 6 |

Comparisons of the property parameters of the aforementioned examples and other examples of the glass fiber composition of the present invention with those of traditional E glass, traditional R glass and improved R glass are further made below by way of tables, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1

| | | A1 | A2 | A3 | A4 | A5 | A6 | A7 |
|---|---|---|---|---|---|---|---|---|
| Component | $SiO_2$ | 59.6 | 59.6 | 59.5 | 60.0 | 60.0 | 59.6 | 59.6 |
| | $Al_2O_3$ | 15.5 | 15.6 | 15.5 | 15.5 | 15.5 | 15.4 | 15.4 |
| | CaO | 15.1 | 14.1 | 11.9 | 11.9 | 11.9 | 15.5 | 15.5 |
| | MgO | 7.5 | 8.6 | 8.9 | 8.9 | 8.9 | 7.6 | 7.6 |
| | SrO | 0.5 | 0 | 2.0 | 1.5 | 1.0 | 0 | 0 |
| | $Na_2O$ | 0.2 | 0.2 | 0.2 | 0.2 | 0.2 | 0.2 | 0.2 |
| | $K_2O$ | 0.4 | 0.6 | 0.2 | 0.4 | 0.5 | 0.2 | 0.4 |
| | $Li_2O$ | 0.35 | 0.4 | 0.64 | 0.6 | 0.06 | 0.72 | 0.45 |
| | $Bi_2O_3$ | 0.1 | 0.05 | 0.32 | 0.08 | 0.02 | 0.06 | 0.06 |
| | $Fe_2O_3$ | 0.4 | 0.38 | 0.35 | 0.42 | 0.42 | 0.42 | 0.42 |
| | $TiO_2$ | 0.35 | 0.45 | 0.4 | 0.4 | 1.0 | 0.3 | 0.37 |
| | $CeO_2$ | 0 | 0.02 | 0 | 0 | 0 | 0 | 0 |
| Ratio | C1 | 3.0 | 8.0 | 2.0 | 7.5 | 3.0 | 12.0 | 7.5 |
| | C2 | 0.53 | 0.61 | 0.91 | 0.87 | 0.83 | 0.49 | 0.49 |
| | C3 | 0.93 | 1.0 | 0.82 | 0.85 | 0.90 | 1.0 | 1.0 |
| Parameter | Forming temperature/° C. | 1273 | 1274 | 1274 | 1279 | 1282 | 1272 | 1276 |
| | Liquidus temperature/° C. | 1195 | 1194 | 1196 | 1195 | 1197 | 1196 | 1196 |
| | ΔT/° C. | 78 | 80 | 78 | 84 | 85 | 76 | 80 |
| | Filament strength/MPa | 4132 | 4143 | 4175 | 4182 | 4120 | 4170 | 4165 |

TABLE 1-continued

|  | | A1 | A2 | A3 | A4 | A5 | A6 | A7 |
|---|---|---|---|---|---|---|---|---|
|  | Refractive index | 1.568 | 1.569 | 1.570 | 1.570 | 1.568 | 1.569 | 1.569 |
|  | Amount of bubbles/pcs | 6 | 4 | 4 | 6 | 7 | 6 | 7 |

TABLE 2

|  |  | A8 | A9 | A10 | A11 | Traditional E glass | Traditional R glass | Improved R glass |
|---|---|---|---|---|---|---|---|---|
| Component | $SiO_2$ | 59.6 | 59.6 | 59.6 | 59.6 | 54.16 | 60 | 58 |
|  | $Al_2O_3$ | 15.4 | 15.4 | 15.4 | 15.4 | 14.32 | 25 | 17.9 |
|  | CaO | 15.5 | 15.5 | 11.6 | 15.5 | 22.12 | 9 | 14.4 |
|  | MgO | 7.6 | 7.6 | 9.3 | 7.6 | 0.41 | 6 | 8.5 |
|  | SrO | 0 | 0 | 1.8 | 0 | 0 | 0 | 0 |
|  | $B_2O_3$ | 0 | 0 | 0 | 0 | 7.6 | 0 | 0 |
|  | $Na_2O$ | 0.2 | 0.2 | 0.2 | 0.3 | 0.45 | trace amount | 0.1 |
|  | $K_2O$ | 0.54 | 0.6 | 0.6 | 0.6 | 0.25 | trace amount | 0.6 |
|  | $Li_2O$ | 0.24 | 0.12 | 0.4 | 0 | 0 | 0 | 0 |
|  | $Bi_2O_3$ | 0.06 | 0.06 | 0 | 0.06 | 0 | 0 | 0 |
|  | $Fe_2O_3$ | 0.42 | 0.42 | 0.4 | 0.42 | 0.35 | trace amount | trace amount |
|  | $TiO_2$ | 0.44 | 0.5 | 0.7 | 0.52 | 0.34 | trace amount | 0.2 |
|  | $CeO_2$ | 0 | 0 | 0 | 0 | 0 | 0 | 0 |
| Ratio | C1 | 4.0 | 2.0 | — | 0 | 0 | 0 | 0 |
|  | C2 | 0.49 | 0.49 | 0.96 | 0.49 | 0.02 | 0.67 | 0.59 |
|  | C3 | 1.0 | 1.0 | 0.84 | 1.0 | 1.0 | 1.0 | 1.0 |
| Parameter | Forming temperature/° C. | 1280 | 1282 | 1285 | 1284 | 1175 | 1430 | 1289 |
|  | Liquidus temperature/° C. | 1196 | 1198 | 1201 | 1201 | 1075 | 1350 | 1280 |
|  | ΔT/° C. | 84 | 84 | 84 | 83 | 100 | 80 | 9 |
|  | Filament strength/MPa | 4132 | 4112 | 4080 | 4078 | 3265 | 4220 | 4089 |
|  | Refractive index | 1.567 | 1.566 | 1.564 | 1.564 | 1.566 | 1.561 | 1.562 |
|  | Amount of bubbles/pcs | 8 | 8 | 10 | 15 | 3 | 30 | 25 |

It can be seen from the values in the above tables that, compared with the traditional R glass and the improved R glass, the glass fiber composition of the present invention has the following advantages: (1) much lower liquidus temperature, which helps to reduce crystallization risk and increase the fiber drawing efficiency; (2) much lower amount of bubbles, which indicates a significant quality improvement of the glass melt according to the present invention; (3) significantly improved glass refractive index, especially in the examples that meet the requirement of the ratio C1, the improvements are more significant. At the same time, the filament strength of the present invention is similar to that of traditional R glass, and is much higher than that of traditional E glass. Specifically, compared with R glass, the glass fiber composition of the present invention has made a breakthrough in terms of the melting performance and refractive index of glass with significantly reduced amount of bubbles and remarkably improved refractive index under the same conditions. Furthermore, the overall technical solution of the present invention has a higher cost performance ratio compared with that of traditional R glass or improved R glass, thereby enabling the easy achievement of large-scale industrial production.

By using both $Li_2O$ and $Bi_2O_3$ and rationally determining the content ratio of $Li_2O$ to $Bi_2O_3$ as well as the content ratios among CaO, MgO and SrO, the present invention ensures that the resulted glass fiber has high mechanical properties and significantly improved refractive index; meanwhile, it greatly improves the melting and fiber forming efficiencies of glass by enabling a melting temperature and a fiberizing temperature significantly lower than those of traditional R glass, and further reduces the amount of bubbles and crystallization risk. Therefore, the glass fiber composition of the present invention is more suitable for large-scale production with refractory-lined furnaces.

The glass fiber composition according to the present invention can be used for making glass fibers having the aforementioned excellent properties.

The glass fiber composition according to the present invention can be used in combination with one or more organic and/or inorganic materials for preparing composite materials having excellent performances, such as glass fiber reinforced base materials.

Finally, what is should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by the phrase "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by all the examples of the present invention.

INDUSTRIAL APPLICABILITY OF THE INVENTION

The glass fiber composition of the present invention can reduce the forming temperature and liquidus temperature of the glass, make the melting, clarifying and fiber forming properties be close to those of E glass, enable a melting temperature and a fiberizing temperature significantly lower than those of traditional R glass, and further reduces the amount of bubbles, viscosity and crystallization risk of glass. Therefore, the glass fiber composition of the present invention is more suitable for large-scale production with refractory-lined furnaces. The glass fiber composition according to the present invention can be used for making glass fibers having the aforementioned excellent properties, and the glass fiber composition according to the present invention can be used in combination with one or more organic and/or inorganic materials for preparing composite materials having excellent performances, such as glass fiber reinforced base materials.

The invention claimed is:

1. A glass fiber composition, comprising the following components expressed as percentage by weight:

| | |
|---|---|
| $SiO_2$ | 56-64% |
| $Al_2O_3$ | 12-18% |
| $Na_2O$ | 0.1-1% |
| $K_2O$ | 0.1-1% |
| $Fe_2O_3$ | 0.1-1% |
| $Li_2O + Bi_2O_3$ | 0.05-1% |
| $CaO + MgO + SrO$ | 19-25% |
| $TiO_2$ | 0.1-1.5% |
| $CeO_2$ | 0-1% | wherein, the content range of $Bi_2O_3$ by weight percentage is 0.02-0.35%, a weight percentage ratio $C1=Li_2O/Bi_2O_3$ is greater than 1, and a weight percentage ratio $C2=(MgO+SrO)/CaO$ is 0.4-1, and a weight percentage ratio $C3=MgO/(MgO+SrO)$ is greater than 0.7.

2. The glass fiber composition according to claim 1, wherein the weight percentage ratio $C1=Li_2O/Bi_2O_3$ is 2-12.

3. The glass fiber composition according to claim 1, wherein the weight percentage ratio $C2=(MgO+SrO)/CaO$ is 0.45-0.9, and the weight percentage ratio $C3=MgO/(MgO+SrO)$ is greater than 0.85.

4. The glass fiber composition according to claim 1, wherein the content range of CaO by weight percentage is greater than 9.5% and less than 12%.

5. The glass fiber composition according to claim 1, wherein the content range of SrO by weight percentage is 0.02-1.5%.

6. The glass fiber composition according to claim 1, comprising the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.1-0.9% |
| $CaO + MgO + SrO$ | 20-24% |
| $TiO_2$ | 0.1-1.5% |
| $SrO$ | 0-2% |
| $CeO_2$ | 0-1% | wherein, the weight percentage ratio $C1=Li_2O/Bi_2O_3$ is greater than 1, and the weight percentage ratio $C2=(MgO+SrO)/CaO$ is 0.45-0.9, and the weight percentage ratio $C3=MgO/(MgO+SrO)$ is greater than 0.85.

7. The glass fiber composition according to claim 1, comprising the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.2-0.8% |
| $CaO + MgO + SrO$ | 21-23.5% |
| $TiO_2$ | 0.1-1.5% |
| $SrO$ | 0.02-1.5% |
| $CeO_2$ | 0-1% | wherein, the weight percentage ratio $C1=Li_2O/Bi_2O_3$ is 2-12, and the weight percentage ratio $C2=(MgO+SrO)/CaO$ is 0.45-0.9, and the weight percentage ratio $C3=MgO/(MgO+SrO)$ is greater than 0.85.

8. A glass fiber being produced from glass fiber compositions described in claim 1.

9. The glass fiber according to claim 8, wherein the weight percentage ratio $C1=Li_2O/Bi_2O_3$ is 2-12, and wherein the weight percentage ratio $C2=(MgO+SrO)/CaO$ is 0.45-0.9, and the weight percentage ratio $C3=MgO/(MgO+SrO)$ is greater than 0.85.

10. The glass fiber according to claim 8, wherein the weight percentage ratio $C1=Li_2O/Bi_2O_3$ is 2-12, and wherein the content range of CaO by weight percentage is greater than 9.5% and less than 12%.

11. The glass fiber according to claim 8, comprising the following components expressed as percentage by weight:

| | |
|---|---|
| $SiO_2$ | 58-62% |
| $Al_2O_3$ | 14-16.5% |
| $Na_2O$ | 0.1-1% |
| $K_2O$ | 0.1-1% |
| $Fe_2O_3$ | 0.1-1% |
| $Li_2O + Bi_2O_3$ | 0.1-0.9% |
| $CaO + MgO + SrO$ | 20-24% |
| $TiO_2$ | 0.1-1.5% |
| $SrO$ | 0.02-1.5% |
| $CeO_2$ | 0-1% | wherein, the weight percentage ratio C1=Li$_2$O/Bi$_2$O$_3$ is greater than 1, and the weight percentage ratio C2=(MgO+SrO)/CaO is 0.45-0.9, and the weight percentage ratio C3=MgO/(MgO+SrO) is greater than 0.85.

12. The glass fiber according to claim 8, comprising the following components expressed as percentage by weight:

| | |
|---|---|
| SiO$_2$ | 58-62% |
| Al$_2$O$_3$ | 14-16.5% |
| Na$_2$O | 0.1-1% |
| K$_2$O | 0.1-1% |
| Fe$_2$O$_3$ | 0.1-1% |
| Li$_2$O + Bi$_2$O$_3$ | 0.2-0.8% |
| CaO + MgO + SrO | 21-23.5% |
| TiO$_2$ | 0.1-1.5% |
| SrO | 0.02-1.5% |
| CeO$_2$ | 0-1% | wherein, the weight percentage ratio C1=Li$_2$O/Bi$_2$O$_3$ is 2-12, and the weight percentage ratio C2=(MgO+SrO)/CaO is 0.45-0.9, and the weight percentage ratio C3=MgO/(MgO+SrO) is greater than 0.85, and wherein the content range of Bi$_2$O$_3$ by weight percentage is 0.02-0.35%.

13. The glass fiber according to claim 8, comprising the following components expressed as percentage by weight:

| | |
|---|---|
| SiO$_2$ | 58-62% |
| Al$_2$O$_3$ | 14-16.5% |
| Na$_2$O | 0.1-1% |
| K$_2$O | 0.1-1% |
| Fe$_2$O$_3$ | 0.1-1% |
| Li$_2$O + Bi$_2$O$_3$ | 0.1-0.9% |
| CaO + MgO + SrO | 20-24% |
| TiO$_2$ | 0.1-1.5% |
| SrO | 0-2% |
| CeO$_2$ | 0-1% | wherein, the weight percentage ratio C1=Li$_2$O/Bi$_2$O$_3$ is greater than 1, and the weight percentage ratio C2=(MgO+SrO)/CaO is 0.45-0.9, and the weight percentage ratio C3=MgO/(MgO+SrO) is greater than 0.85.

14. A composite material incorporating the glass fiber described in claim 8.

15. The composite material according to claim 14, wherein the weight percentage ratio C1=Li$_2$O/Bi$_2$O$_3$ is 2-12, and wherein the weight percentage ratio C2=(MgO+SrO)/CaO is 0.45-0.9, and the weight percentage ratio C3=MgO/(MgO+SrO) is greater than 0.85.

16. The composite material according to claim 14, wherein the weight percentage ratio C1=Li$_2$O/Bi$_2$O$_3$ is 2-12, and wherein the content range of CaO by weight percentage is greater than 9.5% and less than 12%.

17. The composite material according to claim 14, comprising the following components expressed as percentage by weight:

| | |
|---|---|
| SiO$_2$ | 58-62% |
| Al$_2$O$_3$ | 14-16.5% |
| Na$_2$O | 0.1-1% |
| K$_2$O | 0.1-1% |
| Fe$_2$O$_3$ | 0.1-1% |
| Li$_2$O + Bi$_2$O$_3$ | 0.1-0.9% |
| CaO + MgO + SrO | 20-24% |
| TiO$_2$ | 0.1-1.5% |
| SrO | 0.02-1.5% |
| CeO$_2$ | 0-1% | wherein, the weight percentage ratio C1=Li$_2$O/Bi$_2$O$_3$ is greater than 1, and the weight percentage ratio C2=(MgO+SrO)/CaO is 0.45-0.9, and the weight percentage ratio C3=MgO/(MgO+SrO) is greater than 0.85.

18. The composite material according to claim 14, comprising the following components expressed as percentage by weight:

| | |
|---|---|
| SiO$_2$ | 58-62% |
| Al$_2$O$_3$ | 14-16.5% |
| Na$_2$O | 0.1-1% |
| K$_2$O | 0.1-1% |
| Fe$_2$O$_3$ | 0.1-1% |
| Li$_2$O + Bi$_2$O$_3$ | 0.2-0.8% |
| CaO + MgO + SrO | 21-23.5% |
| TiO$_2$ | 0.1-1.5% |
| SrO | 0.02-1.5% |
| CeO$_2$ | 0-1% | wherein, the weight percentage ratio C1=Li$_2$O/Bi$_2$O$_3$ is 2-12, and the weight percentage ratio C2=(MgO+SrO)/CaO is 0.45-0.9, and the weight percentage ratio C3=MgO/(MgO+SrO) is greater than 0.85, and wherein the content range of Bi$_2$O$_3$ by weight percentage is 0.02-0.35%.

19. The composite material according to claim 14, comprising the following components expressed as percentage by weight:

| | |
|---|---|
| SiO$_2$ | 58-62% |
| Al$_2$O$_3$ | 14-16.5% |
| Na$_2$O | 0.1-1% |
| K$_2$O | 0.1-1% |
| Fe$_2$O$_3$ | 0.1-1% |
| Li$_2$O + Bi$_2$O$_3$ | 0.1-0.9% |
| CaO + MgO + SrO | 20-24% |
| TiO$_2$ | 0.1-1.5% |
| SrO | 0-2% |
| CeO$_2$ | 0-1% | wherein, the weight percentage ratio C1=Li$_2$O/Bi$_2$O3 is greater than 1, and the weight percentage ratio C2=(MgO+SrO)/CaO is 0.45-0.9, and the weight percentage ratio C3=MgO/(MgO+SrO) is greater than 0.85.

* * * * *